United States Patent [19]
Takatsu et al.

[11] 3,914,454
[45] Oct. 21, 1975

[54] PREPARATION OF CEREAL FOODS

[75] Inventors: Mitsumune Takatsu, Kusatsu; Fumio Ohnishi, Osaka; Junichi Minami, Tondabaya, all of Japan

[73] Assignee: Nissin Shokuhin Kaisha, Ltd., Osaka, Japan

[22] Filed: Nov. 29, 1973

[21] Appl. No.: 419,946

[30] Foreign Application Priority Data
June 18, 1973 Japan............................... 48-68410
June 18, 1973 Japan............................... 48-68411
June 18, 1973 Japan............................... 48-68412

[52] U.S. Cl. ............... 426/309; 426/199; 426/355; 426/441; 426/462
[51] Int. Cl.² ...................... A23L 1/00; A23L 1/10
[58] Field of Search ........... 426/302, 355, 417, 438, 426/441, 508, 510, 511, 309, 199, 462

[56] References Cited
UNITED STATES PATENTS

| | | | |
|---|---|---|---|
| 1,265,236 | 5/1918 | Moore | 426/417 |
| 2,801,176 | 7/1957 | Ozai-Durrani | 426/417 |
| 3,600,192 | 8/1971 | Tanaka et al. | 426/355 |
| 3,706,573 | 12/1972 | Tolson et al. | 426/438 |

*Primary Examiner*—Raymond N. Jones
*Assistant Examiner*—R. B. Penland
*Attorney, Agent, or Firm*—Armstrong, Nikaido & Wegner

[57] ABSTRACT

The present invention provides a method for preparing cereal foods which can be cooked readily and in a very short period of time. Swelled cereal particles are partially dehydrated to a water content of 8–25% by weight and are thereafter fried for a short period of time. Immediately and before cooling, oil is removed from the fried particles.

7 Claims, No Drawings

PREPARATION OF CEREAL FOODS

BACKGROUND OF THE INVENTION

Cereals such as rice, wheat, barley and rye have been used as a staple food from the olden times all over the world.

In general, rice is eaten after dipped in water and then cooked for several ten minutes, wheat is eaten after being milled and then processed into bread, macaroni and biscuit, and barley and rye are eaten together with rice and also as a confectionary material. As can be readily seen, the pre-treatment and cooking of cereals for consumption as a staple food are time-consuming and complicated. Therefore, although investigations have been made on the preparation of instant cereal, there are still many problems of cooking method, cooking period and quality of the cooked product left unsolved, so that a satisfactory preparation of instant cereal has not been achieved.

SUMMARY OF THE INVENTION

The inventors have provided the present invention as a result of extensive studies on the preparation of cereal foods. An object of the present invention is to provide an industrial and economical method of preparing instant cereal which can be cooked readily, and restored rapidly in a short time period of 2 to 3 minutes while maintaining the original shapes of rice, wheat or other cereal. The method comprises the following steps:

a. treating cereal particles with steam to gelatinize the particles without agglomerating the mass of particles;
b. drying the gelatinized particles to a water content of 8–25% by weight;
c. frying the dried particles in an edible oil at a temperature of 150°–220°C for a period of time up to one minute; and
d. immediately removing oil from the fried particles to reduce the oil content; thus providing a cereal food which is ready for consumption after mixing with hot water for a short period of time.

DETAILED DESCRIPTION OF THE INVENTION

The cereals used in the present invention may be of any kind and quality, and include rice, wheat, barley, rye and the like. For example, rice of any country, e.g., Japan, America, Formosa and etc., and of any quality can satisfactorily be used for the practice of the present invention.

The preparation of fried, swelled cereals of the present invention will be illustrated hereinafter.

Cereals are washed with water to remove foreign materials, dipped in water, and then freed of water. When the cereals have a strong offensive odor, they are first subjected to a deodorizing treatment by dipping them in a 0.3 to 1.0% solution of $H_2O_2$, a 0.5 to 2.0% solution of sodium bicarbonate or a 0.3 to 1.0% solution of phosphoric acid, and then freed of water.

Afterwards the cereals are coated uniformly with a non-toxic substance, such as an edible surfactant or edible oil, and then heated to gelatinize. Either normal steam-cooking or pressurized steam-cooking will be carried out to gelatinize the whole interior of the cereal particles. The addition of edible surfactants or edible oil is intended to prevent the agglomeration of cereal particles in the course of drying after steam-cooking, thus it is sufficient to add a small amount, i.e., 0.1–1.0% by weight of such substances. The edible surfactants are glycerin fatty acid esters, sorbitan fatty acid esters and sugar esters, and edible oil or fats may be any of the animal and vegetable oils and fats.

Next, the particles which have been gelatinized are dried at 20° to 100°C by means of hot air or by exposing them to the sun until a water content of the kernel particles is decreased to 8 to 25%. The range of the water content of the dried particles should strictly be controlled because it has a considerable effect, as can be seen from Examples of Table 1, on the degree of swelling during subsequent frying and on the quality of cooked cereal foods.

The cereals after being dried to 8 to 25% of water content, are then subjected to a frying treatment for as a short time as about 5 to 30 seconds in an edible oil previously heated to a temperature at least as high as 150° to 220°C to obtain swelled cereals. Water in them is rapidly removed by this frying-treatment, resulting in the formation of swelled and porous particles. This treatment must be carried out with special attention. What is essential to the treatment is to maintain the edible oil at high temperature of 150° to 220°C. For example, temperatures below 150°C cause a lower degree of swelling, thereby reducing the quality of cooked cereal foods, and temperatures above 220°C cause the so-called browning reaction, thereby adversely affecting their appearance. Oil attached to the fried particles thus obtained penetrates into the swelled kernels in part to replace part of the water, however in a large part the oil sticks to the surface.

The next treatment is a deoiling process in which oil attached to the particles are reduced to less than 16.5% by weight based upon the the weight of the particles from the fried particles. This deoiling can generally be carried out by using centrifugal force, hot air, or chemical solvents such as ethyl alcohol, and may also be carried out by means of vacuum. Thus, it is sufficient to be able to reduce the oil content by any conventional technique.

When the oil content in the swelled cereal particles is reduced by the deoiling-treatment, water is allowed to penetrate into the particles rapidly during cooking, thereby accelerating the restoration of the particles. And the small amount of oil still remaining in the particles after deoiling acts effectively to improve the quality of cooked cereal foods and provides a quality superior to that of conventional puffed cereal foods.

When cooked cereal foods such as cooked rice, pilaff and frizzled rice, are made from the cereal food prepared by the above-described process, it is sufficient for good taste to place the kernels in a frying pan or cooker, add water and heat for 3 minutes. And when the rice cereal food is used to cook water containing foods, such as rice and tea, and "porridge of rice and vegetable", such foods become easily edible in a few minutes after placing them in a bowl and mixing with hot water.

The cereal foods can widely be used, besides the use as a staple food, as a material for cooking edibles such as snack-like foods or rice soups which are eaten after a swelling treatment.

Moreover, in order to obtain seasoned cereal foods, seasonings such as sodium glutamate, sodium succinate and salt, and spices such as pepper and ginger, may be powder-mixed after the frying or may be added during cooking.

EXAMPLE 1

2.0 kg of rice of America origin were washed with water, mixed with glyceric fatty acid in an amount of 1% after steeping in water at 20°C for 15 hours, and then steam-cooked at a pressure of 3 kg/cm$^2$ for 20 minutes in a pressure vessel.

After the pressurized steam-cooking, the cooked rice was dried at 50° to 100°C in a hot air to obtain 1.95 kg of dried rice having a water content of 15%.

The dried rice was fried at 200°C in a lard for 15 seconds to obtain 2.2 kg of swelled and processed rice.

120 g of the swelled rice were placed on a frying pan, mixed with 180 ml of water and cooked by heating for 3 minutes to obtain boiled rice of good taste.

Table 1 shows the relationship between the water content after steam-cooking, and the apparent specific gravity after frying as well as the quality after cooking.

Table 1

Relationship between water content of dried rice and quality thereof after frying

| Water content of rice (%) | Apparent specific gravity of rice after frying | Quality after frying and after cooking | Remarks |
|---|---|---|---|
| 60 | 0.45 | uneven appearance of rice surface, no restoration during cooking | subjected to immediate frying without drying |
| 40 | 0.45 | the same as above, | |
| 30 | 0.32 | hard rice core | |
| 25 | 0.18 | sufficient swelling | the method according to the present invention |
| 10 | 0.17 | and good taste after | |
| 8 | 0.20 | cooking | |
| 4 | 0.40 | rice surface colored red brown; half-cooked rice on cooking | |

Note: Frying was carried out at 210°C for 15 seconds.

Table 2 shows the quality of the swelled rice produced when the oil temperature was varied at a predetermined content of dried rice.

Table 2

Relationship between oil temperature and quality after frying.

| Oil temperature (°C) | Apparent specific gravity of rice after frying | Quality after frying and after cooking |
|---|---|---|
| 110 | 0.54 | insufficient swelling, |
| 130 | 0.42 | half-cooked rice after cooking |
| 150 | 0.28 | sufficient swelling and |
| 170 | 0.21 | good taste after cooking |
| 190 | 0.20 | |
| 210 | 0.18 | |
| 220 | 0.18 | |
| 230 | 0.17 | rice surface colored red brown |

Note: Water content of dried rice was 15.3%. Each frying period was 15 seconds.

2.2 kg of fried swelled rice thus obtained were treated on a centrifuge of 24 cm in diameter, at a temperature of above 48° and at a rate of 900 r.p.m. for 1 minute. Thus, 2.0 kg of deoiled, swelled rice having an oil content of 7.6% were obtained.

The deoiling-treatment should be carried out as soon as possible after frying and before a drop in the temperature of the fried, swelled rice. Because fried swelled rice has a porous structure, oil attached to the rice surface gradually penetrates into rice with the passage of time due to capillary action, resulting in a difficulty of deoiling by physical treatment.

EXAMPLE 2

This example illustrates another method of deoiling in which fried swelled rice is deoiled by blowing with hot air. Swelled rice, the apparent specific gravity and oil content of which were 0.175 and 21.0%, respectively, was placed on a wire net and deoiled by a physical treatment in which hot air of a temperature of above 60°C was blown on the rice from above before a lowering of the temperature of the fried rice occurred. The results obtained by varying the air velocity are as shown in Table 3.

Table 3

| Air velocity (m/sec) | Oil content (%) | Restoration period (min) | Quality after restoration |
|---|---|---|---|
| control | 21.0 | 10–12 | much floating oil |
| 2 | 19.5 | 8–9 | much floating oil |
| 5 | 18.0 | 7–8 | |
| 12 | 17.0 | 6–7 | |
| 14 | 16.0 | 5–6 | a little floating oil |

EXAMPLE 3

This example illustrates a further method of deoiling in which fried swelled rice is chemically deoiled by using a solvent such as ethyl alcohol.

20 grams of swelled rice with an apparent specific gravity of 0.175 and oil content of 21.0% was left in 200 ml of 99.5% ethyl alcohol at a temperature of 30°–70°C for 30 minutes, so that the oil melted out of the rice. After that, most of the ethyl alcohol contained in the rice was removed therefrom by means of a centrifuge, and the rice is processed with a fluidized bed dryer and then dried with steam at reduced pressure. The results are shown in Table 4 and 5.

Table 4

| Extraction Temperature (°C) | Oil content (%) | Restoration period (min.) | Quality after restoration |
|---|---|---|---|
| control | 21.0 | 10–12 | much floating oil |
| 30 | 18.3 | 6–7 | '' |
| 40 | 15.0 | 5–6 | a little floating oil |
| 50 | 11.2 | 3–4 | '' |
| 60 | 7.4 | 3–4 | '' |
| 70 | 4.1 | 2–3 | '' |

Table 5

| Apparatus and methods to remove ethyl alcohol | Percentage of ethyl alcohol in rice |
|---|---|
| Centrifuge (900–1,000 r.p.m., 30 seconds) | 7.0% |
| Fluidized bed dryer (80–90°C, 10 minutes) | 0.3% |
| Process with steam (100 mm/Hg, 30 minutes) | 0.014% |

EXAMPLE 4

This example illustrates deoiling of the cereal food made of wheat in place of rice. The results obtained when fried swelled wheat, the apparent specific gravity and water content of which were 0.268 and 24%, respectively, was deoiled, are as shown in Table 6.

Table 6

| Revolutions (rpm) | Oil content (%) | Restoration period (min.) |
|---|---|---|
| control | 13.9 | 8–10 |
| 300 | 11.8 | 6–7 |
| 600 | 9.2 | 4–5 |
| 900 | 8.0 | 3–4 |
| 1,200 | 8.2 | " |
| 1,500 | 8.1 | " |
| 1,800 | 7.9 | " |
| 2,100 | 8.0 | " |

What is claimed is:

1. A method for preparing cereal foods comprising
   a. washing cereal particles with water;
   b. uniformly coating the washed particles which have been freed of water with a non-toxic substance to prevent agglomeration during subsequent treatment;
   c. treating the coated particles with pressurized steam to gelatinize the particles;
   d. drying the gelatinized particles to a water content of 8–25% by weight;
   e. frying the dried particles in an edible oil at a temperature of 150°–220°C for a period of time up to one minute; and immediately thereafter
   f. removing oil from the fried particles to reduce the oil content to less than 16.5% by weight; thus providing a cereal food which is ready for consumption after mixing with hot water for a short period of time.

2. A method according to claim 1 wherein the cereal food is rice.

3. A method according claim 1 wherein the cereal food is wheat.

4. A method according to claim 1 wherein oil is removed by centrifugation.

5. A method according to claim 1 wherein oil is removed by blowing with hot air.

6. A method according to claim 1 wherein oil is removed by a solvent.

7. A method for preparing preparing cereal foods comprising:
   a. washing cereal particles with water;
   b. uniformly coating the washed particles with a non-toxic edible surfactant or oil to prevent agglomeration during subsequent treatment;
   c. treating the coated particles with pressurized steam to gelatinize the particles;
   d. drying the gelatinized particles to a water content of 8–25% by weight;
   e. frying the dried particles in an edible oil at a temperature of 150°–220°C. for a period of time up to one minute; and immediately thereafter
   f. removing oil from the fried particles to reduce the oil content to less than 16.5% by weight; thus providing a cereal food which is ready for consumption after mixing with hot water for a short period of time.

* * * * *